(12) United States Patent
Fries et al.

(10) Patent No.: US 7,290,135 B2
(45) Date of Patent: Oct. 30, 2007

(54) METHOD AND ARRANGEMENT FOR DATA COMMUNICATION IN A CRYPTOGRAPHIC SYSTEM CONTAINING A PLURALITY OF ENTITIES

(75) Inventors: Steffen Fries, Munich (DE); Wolfgang Klasen, Ottobrunn (DE); Gerald Volkmann, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 830 days.

(21) Appl. No.: 10/108,560

(22) Filed: Mar. 29, 2002

(65) Prior Publication Data
US 2002/0144112 A1   Oct. 3, 2002

(30) Foreign Application Priority Data
Mar. 29, 2001  (DE) ................. 101 15 600

(51) Int. Cl.
*H04L 9/00* (2006.01)
(52) U.S. Cl. ................... 713/163; 380/277
(58) Field of Classification Search ....... 380/278–282; 713/163; 280/277
See application file for complete search history.

(56) References Cited

U.S. PATENT DOCUMENTS 5,748,736 A   5/1998  Mittra 6,049,878 A * 4/2000 Caronni et al. ............... 726/3
6,606,706 B1 * 8/2003 Li ............................. 713/162
6,684,331 B1 * 1/2004 Srivastava .................. 713/163

OTHER PUBLICATIONS

Moy, "RFC 1584: Multicast Extensions to OSPF," Network Working Group, 1994, pp. 1-17.*
Christoph Ruland: Informationassicherheit in Datennetzen, DATACOM-Verlag, Bergheim, 1993, S. 155ff, pp. 155-165.
Mittra, Suvo. "Iolus: A Framework for Scalable Secure Multicasting", Computer Communications Review, Association for Computing Machinery. New York (US), vol. 27, NR. 4, pp. 1-12. (XP002931671), Sep. 1997.

* cited by examiner

*Primary Examiner*—Gilberto Barron, Jr.
*Assistant Examiner*—Jacob Lipman
(74) *Attorney, Agent, or Firm*—Harness, Dickey & Pierce, P.L.C.

(57) ABSTRACT

A method for data communication in a cryptographic system containing a plurality of entities is specified, in which the entities are arranged in a hierarchical structure. If a current entity in the structure is altered, those entities which are connected directly to the current entity's hierarchically superordinate entity are notified of the alteration.

19 Claims, 4 Drawing Sheets

METHOD AND ARRANGEMENT FOR DATA COMMUNICATION IN A CRYPTOGRAPHIC SYSTEM CONTAINING A PLURALITY OF ENTITIES

The present application hereby claims priority under 35 U.S.C. Section 119 on German patent application number DE 10115600.6 filed on Mar. 29, 2001, the entire contents of which are hereby incorporated herein by reference.

FIELD OF THE INVENTION

The invention generally relates to a method and an arrangement for data communication in a cryptographic system containing a plurality of entities.

BACKGROUND OF THE INVENTION

Methods for key distribution and key agreement are known generally (see [1]). One particular problem there is that keys need to be distributed, exchanged or agreed over an (insecure) communications path. To allow this, the following requirements are of particular significance:

1. Confidentiality

It is necessary to ensure that the exchanged key is accessible only to the authorized subscribers and processes. Secret keys need to be kept secret during their generation, distribution, storage and—where possible—even during implementation.

2. Identification of Data Intactness

It is necessary to take measures to ensure that the exchanged keys are available to the authorized subscribers in an unaltered and error-free state. If a transmission channel is subject to a high level of interference, error-correcting methods may be necessary.

3. Identification of Repetition and Delays

One risk is that keys which have already been used will be used a second time, because it may then not even be possible to distinguish the next communication from an earlier one. This risk exists particularly if a key exchange protocol has been subjected to tapping. Accordingly, particularly delays during key distribution can be regarded as suspicious.

4. Authentication of the Origin of the Key or Subkey

Key agreement without authentication may be pointless, because this might be done with a potential hacker. This is prevented by virtue of additional authentication subsequently being carried out using keys which have already been exchanged or agreed securely beforehand.

5. Acknowledgement of Receipt and Verification of the Agreed Key

The acknowledgement of receipt is intended to prove to the sender that the rightful recipient has received the key correctly. Since the exchanged keys are frequently not used directly, but rather serve as subkeys, references, etc., dynamically agreed keys need to be tested before they are used. This verification can be carried out explicitly by reciprocal transformation of prescribed data or implicitly by redundancy added to the protocol elements of the exchange protocol.

The result of this list of requirements, which is not conclusive (inclusive), is that, when they are observed, key distribution which can be implemented with a high level of security is possible.

A particular peculiarity of today's electronic systems is that they are implemented in distributed form. Consequently, a plurality of computers (also: entities, processes, processors, nodes, subscribers) are amalgamated in a network, with the computers being able to communicate with one another. Within the context of key distribution, it is also known practice for the subscribers in the network to be provided with a hierarchical structure. In this context, a particularly popular structure is a tree structure including a root node, branches and nodes, with the nodes, which themselves have no nodes on a lower level, being referred to as leaves of the tree structure.

If a method for key distribution is applied to a hierarchical structure of nodes, in particular to a tree structure, then the alteration of a node needs to involve negotiation of at least one new key for the entire system, that is to say the entire tree, and the new key needs to be communicated to all the nodes of the tree. In this context, a particular drawback is that every node receives a new key and that the same key is always used between two respective nodes. Even if just one particular key (or a symmetrical key pair) is used between two respective nodes, it is a drawback that received data need to be recoded separately for each key and recipient.

SUMMARY OF THE INVENTION

An object of an embodiment of the invention is to present an efficient and economical method for key distribution which avoids at least one of the drawbacks described above.

An object may be achieved by specifying a method for data communication in a cryptographic system containing a plurality of entities, in which the entities are arranged in a structure. If a current entity in the structure is altered, those entities which are connected directly to the current entity's hierarchically superordinate entity can be notified of the alteration.

This advantageously ensures that an association of entities is formed which includes part of the hierarchical structure and allows separate key distribution for this part.

One development is that the data communication includes a method for key distribution.

Another development is that the plurality of entities are nodes or subscribers to the data communication.

A further development is that the plurality of entities are amalgamated in a network.

Another development is that the hierarchical structure is a tree structure.

One particular development is that the alteration of the current entity includes one of the following options:
 a) the current entity is added;
 b) the current entity is removed;
 c) at least one property of the current entity is altered.

Another development is that the notification of alteration involves a modified cryptographic key being transmitted. A further development is that the method for implementing multicast services can be used. This means that a sender simultaneously transmits to a plurality of recipients data encrypted in the same manner, with each recipient being able to perform decryption using the key information associated with the sender.

In addition, an object can be achieved by specifying an arrangement for data communication in a cryptographic system containing a plurality of entities, in which a processor unit is provided which is set up such that a) the entities are arranged in a hierarchical structure;
b) if a current entity in the structure is altered, those entities which are connected directly to the current entity's hierarchically superordinate entity can be notified of the alteration.

Such an arrangement is particularly suitable for carrying out the inventive method or one of its developments explained above.

BRIEF DESCRIPTION OF THE DRAWINGS

Exemplary embodiments of the invention are illustrated and explained with reference to the figures below, in which.

DETAILED DESCRIPTION OF THE PREFERRED EMBODIMENTS

Figure 1:
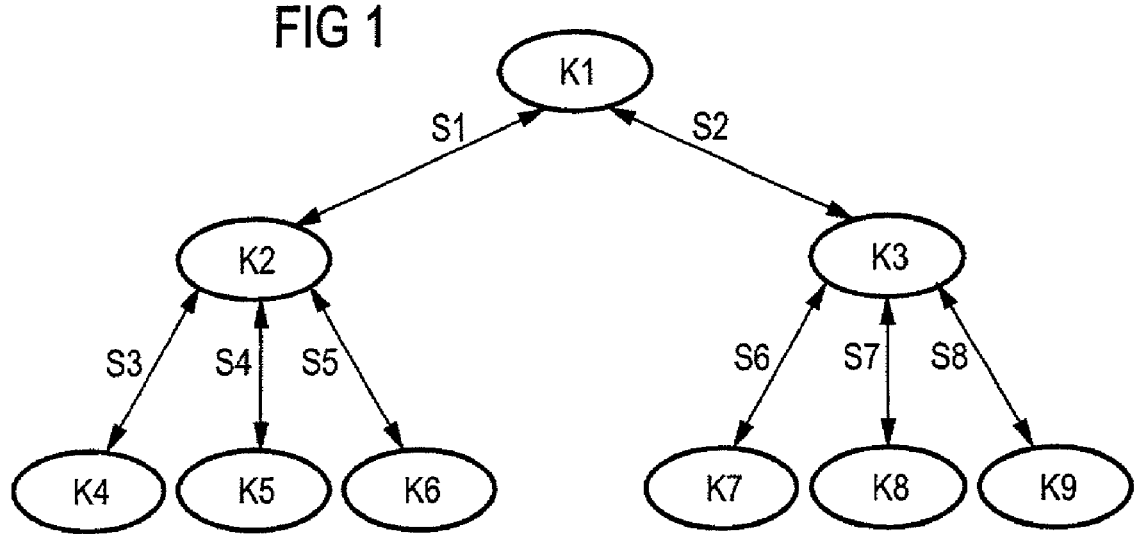
FIG. 1 shows a sketch with a hierarchical structure comprising a plurality of nodes.

FIG. 1 shows a sketch with a hierarchical structure including a plurality of nodes. In this case, by way of example, a root node K1 is shown which is connected to a node K2 via an edge and to a node K3 via an edge. The node K2 is in turn connected to hierarchically subordinate nodes K4, K5 and K6 (in each case via an edge). Similarly, the node K3 is connected to nodes K7, K8 and K9 via a respective edge. Between the node K1 and the node K2, there is a symmetrical key S1 for data encryption. Similarly, there is a key S2 between the nodes K1 and K3, a key S6 between the nodes K3 and K7, a key S7 between the nodes K3 and K8, and a key S8 between the nodes K3 and K9. In addition, there is a key S3 between the nodes K2 and K4, a key S4 between the nodes K2 and K5, and a key S5 between the nodes K2 and K6.

The symmetrical keys S1 to S8 can, in particular, also be in the form of a symmetrical key pair for data encryption between two respective nodes. The key pair ensures that an asymmetric encryption method can be carried out between two respective nodes.

In the embodiment shown in FIG. 1, a particular drawback is that a message which needs to be transmitted to another node, as a current node's directly adjacent node, needs to be repeatedly recoded. In this respect, a "multicast data transfer", that is to say notification of a plurality of nodes without separate respective encryption, is not possible.

Figure 2:
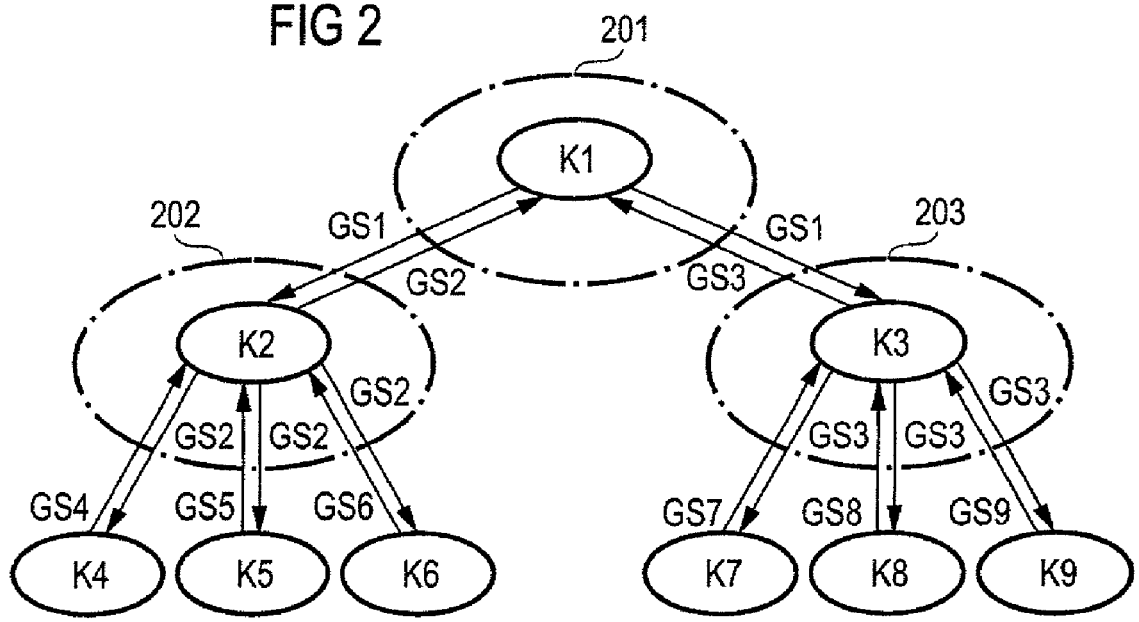
FIG. 2 shows a sketch with a hierarchical tree structure and group keys.

FIG. 2 shows a sketch with a hierarchical tree structure and group keys, where this structure supports a multicast data transfer, in particular.

The nodes K1 to K9 are arranged in accordance with FIG. 1. In this context, each node is a possible initiator for key distribution. The key distribution can be initiated when particular data within the tree structure, be it for the nodes or the structure, change or when the keys need to be renewed at a predetermined time. In particular, addition or removal of a node can involve a change being made to the tree structure such that a new key distribution results.

Each node negotiates a method for key distribution with the node to which it is directly connected. The initiator is, in particular, that node to which a plurality of nodes have been connected. For the method for key distribution, each initiator node negotiates with the directly connected nodes a (common) group key which is used for protecting the data, in particular the integrity and confidentiality thereof.

One advantage is that each node needs to reencrypt the received data only once after decryption—before forwarding them. For the aforementioned multicast data transfer, it is thus possible for each node to process the data only once and to forward them to a multiplicity of addressees. Another advantage is that a hacking attempt which involves feigning a false identity for a node (masquerade) is not possible, since each node has its own key for encryption. In FIG. 2, there is a group key GS1 for the node K1, a group key GS2 for the node K2, and a group key GS3 for the node K3. There is a group key GS4 to GS9 for each of the subordinate nodes K4 to K9. The abovementioned multicast data transfer is provided, for example, such that the node K3 receives data and can forward them to all the nodes K1, K7, K8 and K9 connected to it at once, in which case it need recode the received data only once. If, by way of example, the node K3 receives data from the node K1, then these data have been encrypted using the group key GS1, and the node K3 converts the data, that is to say decrypts the data and encrypts them again using the group key KS3. It then transmits the newly encrypted data to the nodes K7 to K9.

If a new node is then added, the group key needs to be negotiated again only for a tree section, that is to say for a group (see groups 201, 202 or 203 in FIGS. 2 to 4), since the tree section changes for the group. This advantageously means that not every node in the entire hierarchical structure, in this case the entire tree, is affected, but rather only those nodes of a group in which the change is made. Such a change can involve, by way of example, the addition of a new node, the removal of an already existing node, or the changing of particular parameters for a node (or for a plurality of nodes).

The advantages of said solution are, in particular, that the node need recode the data only once, and multicast data transfer can also be ensured using protected data links. New keys are renegotiated only for part of the entire hierarchical structure when a node is altered (added, removed, changed). In addition, the method for key distribution (key management) is economically distributed over a plurality of nodes. Finally, internal hacking attempts, i.e. hacking attempts from nodes in the structure, are not possible because each node has its own key for data protection.

Optionally, the method for key distribution can also be organized on a hierarchical basis. In this case, it is particularly important for the node initiating the method for key distribution to have a superordinate node to which it is directly connected. The initiator negotiates a security union with the subordinate nodes which are directly connected to it. Optionally, the initiator can also agree the security conditions with the superordinate nodes, said security conditions serving as a basis for the method for key distribution with the subordinate node. Alternatively, the initiator can also determine the security conditions independently of the other nodes and can use them in the method for key distribution (key management). In this case, the method for key distribution (key management) is distributed over a plurality of subordinate nodes by the root node on an administrative basis, as a result of which the root node is relieved of load, that is to say the work for the method for key distribution is distributed over a plurality of nodes.

In the manner of FIG. 2, FIG. 3 again shows the hierarchical structure comprising the nodes K1 to K9. A new feature in this case is a node K10 which is arranged below the node K3. This addition of the node K10 means that new keys need to be distributed within the security union 203 if the addition of the node K10 changes anything about the properties of the security union.

Figure 3:
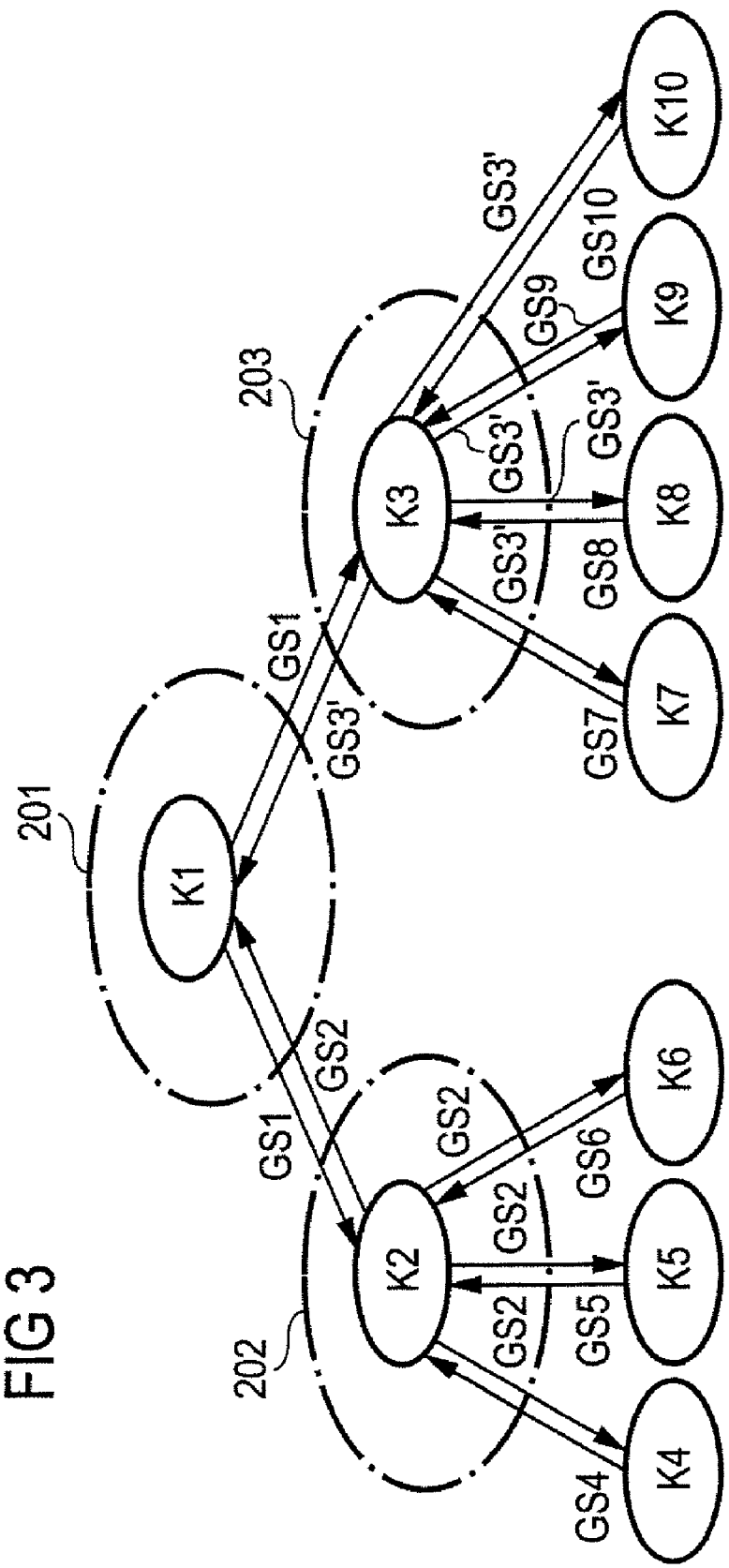
FIG. 3 shows a sketch to illustrate addition of a further node.

In the present case of FIG. 3, a new key is negotiated for the security union 203 around the node K3, said new key then being transmitted in encrypted form to the nodes which are connected directly to the node K3. This new key is the group key GS3' and is transmitted to the nodes K1, K7, K8, K9 and K10. The nodes K2, K4, K5 and K6 remain completely unaffected by the renegotiation of the group key GS3' and hence by the addition of the node K10.

Figure 4:
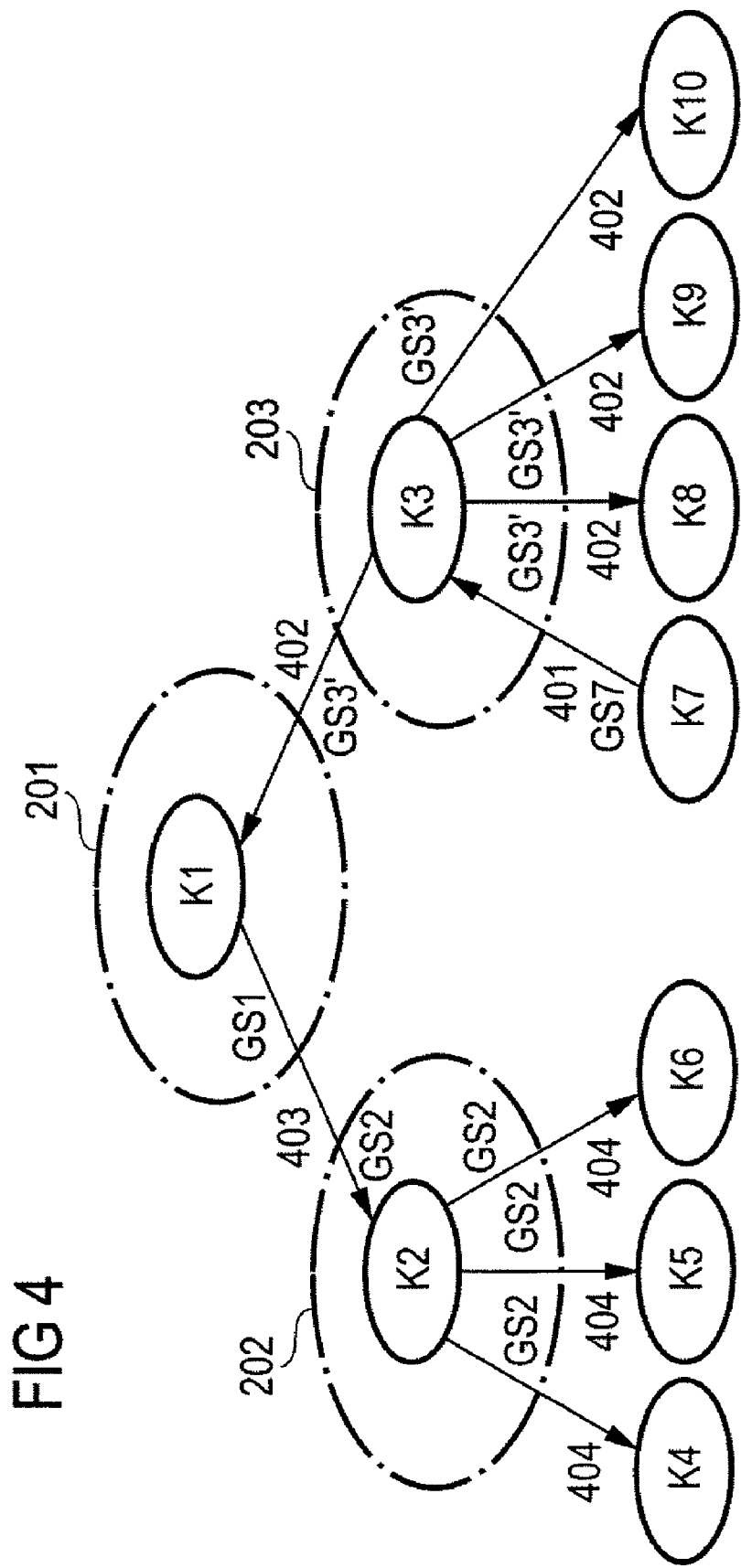
FIG. 4 shows a sketch of a hierarchical structure with steps in a method for data distribution.

FIG. 4 shows a hierarchical structure in accordance with FIG. 3, with an illustration being given of how a message is transmitted from a node K7 to all the other nodes in the hierarchical structure. If the node K7 sends data to all the other nodes in the tree structure, then the node K3, following decryption, needs to encrypt the data once again and can then transmit them to the nodes K8, K9, K10 and K1. The node K1 needs to recode the data once and transmit them to the node K2, which again recodes the data once and distributes them to the nodes K4 to K6 at once. The different data streams have been provided with the reference symbols 401 to 404 in FIG. 4. The data stream 401 is recoded by the node K3 into the data stream 402. This is recoded by the node K1 into the data stream 403, where it is recoded into the data stream 404 in the node K2. The particular advantage is that, from the node K3, the nodes K8, K9, K10 and K1 can be addressed at once during the multicast data transfer and, in particular, can be supplied with the same data stream 402. The situation is similar for transmission of the same data stream 404 to the nodes K4 to K6.

Figure 5:
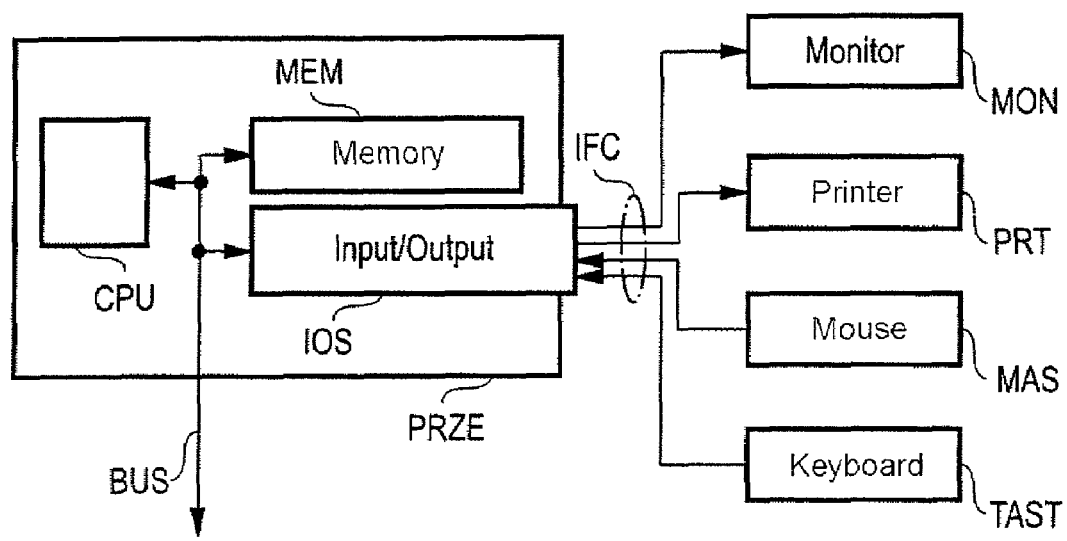
FIG. 5 shows a processor unit.

FIG. 5 shows a processor unit PRZE. The processor unit PRZE can be used to carry out the above-mentioned methodology and can include a processor CPU and a memory MEM. It can further include an input/output interface IOS, which can be used in various ways via an interface IFC: a graphical interface can be used to display an output on a monitor MON and/or to output it on a printer PRT, or any other type of output device. An input can be made using a mouse MAS or a keyboard TAST, or any other type of input device. The processor unit PRZE also can include a data bus BUS connecting the memory MEM, the processor CPU and the input/output interface IOS, for example. Additional components can also be connected to the data bus BUS, e.g. an additional memory, a data store (hard disk) or a scanner, etc.

The following publications have been cited within the scope of this document:

[1] Christoph Ruland: Informationssicherheit in Datennetzen [Information Security in Data Networks], DATACOM-Verlag, Bergheim, 1993, pages 155 ff.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for data communication in a cryptographic system containing a plurality of entities arranged in a hierarchical structure, each of the plurality of entities having at least a first code for encoding data and a second code for decoding data, the method comprising:

notifying, each superordinate entity and subordinate entity connected directly to a first entity of an alteration of a second entity in the structure by changing a first code used by the first entity to encode data sent to the second entity and each entity connected directly to the first entity; wherein the first entity is hierarchically super-ordinate to the second entity, the first code used to encode data at the first entity is the same as the second code used to decode data at the second entity and the second code used to decode data at each entity connected directly to the first entity, and at each entity, the first and second codes are different.

2. The method as claimed in claim 1, wherein the hierarchical structure is a tree structure.

3. The method as claimed in claim 1, wherein the alteration of the current entity includes at least one of the following options:
 a) the second entity is added;
 b) the second entity is removed;
 c) at least one property of the second entity is altered.

4. The method as claimed in claim 1, wherein the notification of alteration involves a modified cryptographic key being transmitted.

5. The method as claimed in claim 1, wherein the method is for implementing multicast services.

6. The method as claimed in claim 1, in which the data communication includes key distribution.

7. The method as claimed in claim 6, wherein the plurality of entities are at least one of nodes and subscribers to the data communication.

8. The method as claimed in claim 6, wherein the plurality of entities are amalgamated in a network.

9. The method as claimed in claim 6, wherein the alteration of the current entity includes at least one of the following options:
 a) the current entity is added;
 b) the current entity is removed;
 c) at least one property of the current entity is altered.

10. The method as claimed in claim 6, wherein the notification of alteration involves a modified cryptographic key being transmitted.

11. The method as claimed in claim 1, wherein the plurality of entities are at least one of nodes and subscribers to the data communication.

12. The method as claimed in claim 11, wherein the plurality of entities are amalgamated in a network.

13. The method as claimed in claim 11, wherein the alteration of the current entity includes at least one of the following options:
 a) the current entity is added;
 b) the current entity is removed;
 c) at least one property of the current entity is altered.

14. The method as claimed in claim 11, wherein the notification of alteration involves a modified cryptographic key being transmitted.

15. The method as claimed in claim 1, wherein the plurality of entities are amalgamated in a network.

16. The method as claimed in claim 15, wherein the alteration of the current entity includes at least one of the following options:
 a) the current entity is added;
 b) the current entity is removed;
 c) at least one property of the current entity is altered.

17. The method as claimed in claim 15, wherein the notification of alteration involves a modified cryptographic key being transmitted.

18. An arrangement for data communication in a cryptographic system containing a plurality of entities arranged in a hierarchical structure, each of the plurality of entities having at least a first code for encoding data and a second code for decoding data, the arrangement comprising:

a processing unit, which is set up such that, the entities are arranged in a hierarchical structure, and each superordinate entity and subordinate entity connected directly to a first entity is notified of an alteration of a second entity in the structure by changing a first code used by the first entity to encode data sent to the second entity and each entity connected directly to the first entity; wherein the first entity is hierarchically super-ordinate to the second entity, the first code used to encode data at the first entity is the same as the second code used to decode data at the second entity and the second code used to decode data at each entity connected directly to the first entity, and at each entity, the first and second codes are different.

19. The arrangement of claim 18, wherein the processing unit includes a processor and a memory.

* * * * *